US011782401B2

United States Patent
Keenan et al.

(10) Patent No.: US 11,782,401 B2
(45) Date of Patent: Oct. 10, 2023

(54) APPARATUS AND METHODS TO BUILD DEEP LEARNING CONTROLLER USING NON-INVASIVE CLOSED LOOP EXPLORATION

(71) Applicant: AspenTech Corporation, Bedford, MA (US)

(72) Inventors: Michael R. Keenan, Sugar Land, TX (US); Qingsheng Quinn Zheng, Sugar Land, TX (US)

(73) Assignee: AspenTech Corporation, Bedford, MA (US)

( * ) Notice: Subject to any disclaimer, the term of this patent is extended or adjusted under 35 U.S.C. 154(b) by 792 days.

(21) Appl. No.: 16/530,055

(22) Filed: Aug. 2, 2019

(65) Prior Publication Data

US 2021/0034023 A1 Feb. 4, 2021

(51) Int. Cl.
*G05B 13/00* (2006.01)
*G05B 13/04* (2006.01)
(Continued)

(52) U.S. Cl.
CPC ......... *G05B 13/048* (2013.01); *G05B 13/027* (2013.01); *G06N 3/044* (2023.01)

(58) Field of Classification Search
CPC ............................ G05B 13/048; G05B 13/027; G05B 13/0265; G06N 3/0445; G06N 3/08
(Continued)

(56) References Cited

U.S. PATENT DOCUMENTS 5,301,101 A 4/1994 MacArthur
5,410,634 A 4/1995 Li
(Continued)

FOREIGN PATENT DOCUMENTS

CN 107430398 A 12/2017
EP 2825920 B1 1/2021
(Continued)

OTHER PUBLICATIONS https://www.google.com/search?q=deep+learning&rlz=1C1GCEA_enUS1008&oq=deep+learinig&aqs=chrome.1.69i57j0i10i433j0i10j0i10i131i433j46i10j0i10l3j0i10i433j0i10.5742j0j1&sourceid=chrome&ie=UTF-8.*

(Continued)

*Primary Examiner* — Russell S Glass
(74) *Attorney, Agent, or Firm* — Hamilton, Brook, Smith & Reynolds, P.C.

(57) ABSTRACT

Deep Learning is a candidate for advanced process control, but requires a significant amount of process data not normally available from regular plant operation data. Embodiments disclosed herein are directed to solving this issue. One example embodiment is a method for creating a Deep Learning based model predictive controller for an industrial process. The example method includes creating a linear dynamic model of the industrial process, and based on the linear dynamic model, creating a linear model predictive controller to control and perturb the industrial process. The linear model predictive controller is employed in the industrial process and data is collected during execution of the industrial process. The example method further includes training a Deep Learning model of the industrial process based on the data collected using the linear model predictive controller, and based on the Deep Learning model, creating a Deep Learning model predictive controller to control the industrial process.

20 Claims, 11 Drawing Sheets

(51) Int. Cl.
*G05B 13/02* (2006.01)
*G06N 3/044* (2023.01)

(58) Field of Classification Search
USPC .......................................................... 706/23
See application file for complete search history.

(56) References Cited

U.S. PATENT DOCUMENTS

| | | | |
|---|---|---|---|
| 5,640,491 A | 6/1997 | Bhat | |
| 5,682,309 A | 10/1997 | Bartusiak et al. | |
| 6,056,781 A | 5/2000 | Wassick et al. | |
| 6,088,630 A | 7/2000 | Cawlfield | |
| 6,819,964 B2 | 11/2004 | Harmse | |
| 6,937,966 B1 | 8/2005 | Hellerstein et al. | |
| 7,050,863 B2 | 5/2006 | Mehta et al. | |
| 7,085,615 B2 | 8/2006 | Persson et al. | |
| 7,194,317 B2 | 3/2007 | Kothare et al. | |
| 7,209,793 B2 | 4/2007 | Harmse et al. | |
| 7,213,007 B2 | 5/2007 | Grichnik | |
| 7,257,501 B2 | 8/2007 | Zhan et al. | |
| 7,330,804 B2 | 2/2008 | Turner et al. | |
| 7,421,374 B2 | 9/2008 | Zhan et al. | |
| 8,295,952 B2 | 10/2012 | Macarthur et al. | |
| 8,296,070 B2 | 10/2012 | Paxson et al. | |
| 8,560,092 B2 | 10/2013 | Zheng et al. | |
| 8,755,940 B2 | 6/2014 | Lou et al. | |
| 8,762,301 B1 | 6/2014 | Buckbee, Jr. | |
| 9,046,882 B2 | 6/2015 | Bartee et al. | |
| 9,141,911 B2 | 9/2015 | Zhao et al. | |
| 9,367,804 B1 | 6/2016 | Moon et al. | |
| 9,513,610 B2 | 12/2016 | Zheng et al. | |
| 9,535,808 B2 | 1/2017 | Bates et al. | |
| 9,727,035 B2 | 8/2017 | Keenan et al. | |
| 10,031,510 B2 | 7/2018 | Zhao et al. | |
| 10,114,367 B2 | 10/2018 | Bates et al. | |
| 10,739,752 B2 | 8/2020 | Zhao et al. | |
| 10,990,067 B2 | 4/2021 | Modi | |
| 11,630,446 B2 | 4/2023 | Andreu et al. | |
| 2001/0051862 A1 | 12/2001 | Ishibashi et al. | |
| 2002/0099724 A1 | 7/2002 | Harmse | |
| 2003/0220828 A1 | 11/2003 | Hwang et al. | |
| 2004/0049295 A1 | 3/2004 | Wojsznis et al. | |
| 2004/0249481 A1 | 12/2004 | Zheng et al. | |
| 2005/0010369 A1 | 1/2005 | Varpela et al. | |
| 2005/0149208 A1 | 7/2005 | Harmse et al. | |
| 2005/0240382 A1 | 10/2005 | Nakaya et al. | |
| 2006/0079983 A1 | 4/2006 | Willis | |
| 2006/0111858 A1 | 5/2006 | Zhu | |
| 2006/0136138 A1 | 6/2006 | Hicklin et al. | |
| 2007/0225835 A1 | 7/2007 | Zhu | |
| 2008/0183311 A1 | 7/2008 | MacArthur et al. | |
| 2008/0188957 A1 | 8/2008 | Cutler | |
| 2009/0005889 A1 | 1/2009 | Sayyar-Rodsari | |
| 2009/0210081 A1 | 8/2009 | Sustaeta et al. | |
| 2009/0222108 A1 | 9/2009 | Lou et al. | |
| 2010/0049369 A1 | 2/2010 | Lou et al. | |
| 2010/0241247 A1 | 9/2010 | Attarwala | |
| 2011/0066299 A1 | 3/2011 | Gray et al. | |
| 2011/0130850 A1 | 6/2011 | Zheng et al. | |
| 2012/0003623 A1 | 1/2012 | Bartee et al. | |
| 2012/0004893 A1 | 1/2012 | Vaidyanathan et al. | |
| 2012/0084400 A1 | 4/2012 | Almadi et al. | |
| 2012/0173004 A1 | 7/2012 | Radl | |
| 2013/0151179 A1 | 6/2013 | Gray | |
| 2013/0151212 A1 | 6/2013 | Gray et al. | |
| 2013/0204403 A1 | 8/2013 | Zheng et al. | |
| 2013/0246316 A1 | 9/2013 | Zhao et al. | |
| 2013/0338842 A1 | 12/2013 | Inoue et al. | |
| 2014/0114598 A1 | 4/2014 | Almadi et al. | |
| 2014/0115121 A1 | 4/2014 | Almadi et al. | |
| 2015/0316905 A1 | 11/2015 | Zheng et al. | |
| 2016/0018796 A1 | 1/2016 | Lu | |
| 2016/0018797 A1 | 1/2016 | Lu | |
| 2016/0048119 A1 | 2/2016 | Wojsznis et al. | |
| 2016/0260041 A1 | 9/2016 | Horn et al. | |
| 2016/0320768 A1 | 11/2016 | Zhao et al. | |
| 2017/0308802 A1 | 10/2017 | Ramsøy et al. | |
| 2018/0019910 A1 | 1/2018 | Tsagkaris et al. | |
| 2018/0060738 A1 | 3/2018 | Achin et al. | |
| 2018/0157225 A1 | 6/2018 | Dave et al. | |
| 2018/0299862 A1 | 10/2018 | Zhao et al. | |
| 2018/0299875 A1 | 10/2018 | Mariswamy et al. | |
| 2018/0341252 A1 | 11/2018 | Lu | |
| 2018/0348717 A1 | 12/2018 | Zhao et al. | |
| 2018/0356806 A1 | 12/2018 | Dave et al. | |
| 2019/0095816 A1 | 3/2019 | Lee et al. | |
| 2019/0101902 A1 | 4/2019 | Sayyarrodsari et al. | |
| 2019/0102352 A1 | 4/2019 | Sayyarrodsari et al. | |
| 2019/0102360 A1 | 4/2019 | Sayyarrodsari et al. | |
| 2019/0102657 A1 | 4/2019 | Sayyarrodsari et al. | |
| 2019/0179271 A1 | 6/2019 | Modi et al. | |
| 2019/0188584 A1 | 6/2019 | Rao et al. | |
| 2019/0197403 A1* | 6/2019 | Schmidhuber | G06N 3/084 |
| 2019/0236447 A1 | 8/2019 | Cohen et al. | |
| 2020/0103838 A1 | 4/2020 | Bertinetti et al. | |
| 2020/0133210 A1 | 4/2020 | Zheng | |
| 2020/0257969 A1* | 8/2020 | Goloubew | G06F 16/35 |
| 2020/0258157 A1 | 8/2020 | Law | |
| 2020/0379442 A1 | 12/2020 | Chan | |
| 2020/0387818 A1 | 12/2020 | Chan | |
| 2021/0116891 A1 | 4/2021 | Zhao | |
| 2022/0260980 A1 | 8/2022 | Andreu et al. | |

FOREIGN PATENT DOCUMENTS

| | | |
|---|---|---|
| GB | 2409293 A | 6/2005 |
| JP | 06-028009 A | 2/1994 |
| JP | 06-083427 A | 3/1994 |
| JP | 06-187004 | 7/1994 |
| JP | 09-212207 A | 8/1997 |
| JP | 2002-526852 A | 8/2002 |
| JP | 2002-329187 A | 11/2002 |
| JP | 2004-265381 A | 9/2004 |
| JP | 2005-202934 | 7/2005 |
| JP | 2009-509217 A | 3/2009 |
| JP | 2009-516301 | 4/2009 |
| JP | 2011-054163 A | 3/2011 |
| JP | 2013-535730 A | 9/2013 |
| JP | 2019-021186 A | 2/2019 |
| JP | 2019-521444 A | 7/2019 |
| WO | 00/20939 A1 | 4/2000 |
| WO | 2002/005042 A3 | 1/2002 |
| WO | 2008/119008 | 10/2008 |
| WO | 2012/012723 A2 | 1/2012 |
| WO | 2012/118067 A1 | 9/2012 |
| WO | 2013/119665 A1 | 8/2013 |
| WO | 2013/170041 A2 | 11/2013 |
| WO | 2015/149928 A2 | 10/2015 |
| WO | 2016/093960 A1 | 6/2016 |
| WO | 2018/009546 A1 | 1/2018 |
| WO | 2018/075995 A1 | 4/2018 |
| WO | 2018/223000 A1 | 12/2018 |
| WO | 2019086760 A1 | 5/2019 |
| WO | 2020091942 A1 | 5/2020 |
| WO | 2020/227383 A1 | 11/2020 |
| WO | 2020/247204 A1 | 12/2020 |
| WO | 2021025841 A1 | 2/2021 |
| WO | 2021/076760 A1 | 4/2021 |

OTHER PUBLICATIONS

International Preliminary Report on Patentability received for PCT Patent Application No. PCT/US2020/042239, dated Feb. 17, 2022, 8 pages.

Zhao, et al., "An Identification Approach to Nonlinear State Space Model for Industrial Multivariable Model Predictive Control", Proceedings of the American Control Conference, Philadelphia, Pennsylvania, Jun. 1998.

Qin, et al., "A Survey of Industrial Model Predictive Control Technology", Control Engineering Practice 11 (2003).

International Preliminary Report on Patentability for International Application No. PCT/US2013/024932, "Apparatus And Methods

(56) References Cited

OTHER PUBLICATIONS

For Non-Invasive Closed Loop Step Testing Using A Tunable Trade-Off Factor," dated Aug. 12, 2014.
International Search Report and the Written Opinion of the International Searching Authority for International Application No. PCT/US2013/024932, dated May 2, 2013, 9 pages.
Soliman, M., "Multiple Model Predictive Control for Wind Turbines with Doubly Fed Induction Generators," IEEE Transactions on Sustainable Energy, vol. 2, No. 3, pp. 215-225 (2011).
International Preliminary Report on Patentability for PCT/US2019/054465 dated May 14, 2021 titled "Apparatus and Methods for Non-Invasive Closed Loop Step Testing with Controllable Optimization Relaxation".
Mohamed, et al., "A Neural-Network-Based Model Predictive Control of Three-Phase Inverter with an Output LC Filter," Cornell University Library, ArXiv:1902.099643v3, XP081457097, whole document, Feb. 22, 2019.
"Notification of Transmittal of the International Search Report and The Written Opinion of the International Searching Authority, or the Declaration," for International Application No. PCT/US2020/042239, entitled "Apparatus And Methods To Build Deep Learning Controller Using Non-Invasive Closed Loop Exploration," dated Oct. 14, 2020.
S. Joe Qin & Thomas A Badgwell, "A survey of industrial model predictive control technology," Control Engineering Practice, 11:733-764 (2003).
International Preliminary Report on Patentability received for PCT Patent Application No. PCT/US2020/055787, dated Apr. 28, 2022, 7 pages.
Bhutani, N., et al, "First-Principles, Data-Based, and Hybrid Modeling and Optimization of an Industrial Hydrocracking Unit", Ind. Eng. Chem. Res., 45 (23), pp. 7807-7816 (2006).
Brill, et al., "Transportation of liquids in multiphase pipelines under low liquid loading conditions." Ph.D. Dissertation, The University of Tulsa (1995).
Caetano, "Upward vertical two-phase flow through an annulus," Ph.D. Dissertation, The University of Tulsa (1985).
European Search Report Application No. 17 751 159.9, entitled Computer System And Method For The Dynamic Construction And Online Deployment Of An Operation-Centric First-Principles Process Model For Predictive Analytics, dated Jan. 21, 2020.
Fair, J.R. and Mathews, R.L., "How to predict sieve tray entrainment and flooding," Petro/Chem Engineer 33(10), p. 45, 1961.
Hebert, D., "First-Principle Verus Data-Driven Models—Cost and Time and Skill Required to Develop an Application-Specific Model have Been Barriers to Using First-Principle Modeling Tools" http://www.controlglobal.com/articles/2008/200/ (2008).
http://web.maths.unsw.edu.au/.about.fkuo/sobol/ (2010).
Hussein, "Adaptive Artificial Neural Network-Based Models for Instantaneous Power Estimation Enhancement in Electric Vehicles' Li-Ion Batteries", IEEE Transactions on Industry Applications, vol. 55, No. 1, Jan. 1, 2019, 840-849, XP011700440.
International Search Report and Written Opinion for PCT/US2017/040725 dated Oct. 16, 2017., entitled "Computer System and Method for the Dynamic Construction and Online Deployment of an Operation-Centric First-Principles Process Model for Predictive Analytics".
International Search Report and Written Opinion received for PCT Patent Application No. PCT/US2020/031636, dated Jul. 15, 2020, 9 pages.
International Search Report and Written Opinion received for PCT Patent Application No. PCT/US2020/034530, dated Jul. 24, 2020, 9 pages.
International Search Report and Written Opinion received for PCT Patent Application No. PCT/US2020/055787, dated Jan. 29, 2021, 8 pages.
Kister, Distillation Operation (Mechanical-Engineering), Bookmart Press, Inc., p. 376, 1990.
Kister, H.Z. and Haas, J.R., "Predict entrainment flooding on sieve and valve trays," Chemical Engineering Progress, 86(9), p. 63, 1990.
Machine Learning in Python, http://dl.acm.org/citation.cfm?id=2078195 (2011).
Pantelides C. C, et al., "The online use of first-principles models in process operations: Review, current status and future needs", Computers & Chemical Engineering, vol. 51, ISSN: 0098-1354, pp. 136-148 (2013).
Potocnik P, et al, "Neural Net Based Hybrid Modeling of the Methanol Synthesis Process", Neural Processing Letters, Kluwer Academic Publishers, No. 3, Jan. 1, 2000, 219-228. XP000949966.
Psichogios, D.C. and Ungar, L. H., "A Hybrid Neural Network-First Principles Approach to Process Modeling", AIChE Journal, 38: 1499-1511 (1992).
Rakthanmanon, "Searching and Mining Trillions of Time Series Subsequences under Dynamic Time Warping," the 18th ACM SIGKDD Conference on Knowledge discovery and Data Mining, Aug. 12-16, 2012.
Random Forest Regressor, http://scikil-learn.org/slable/modules/generaled/sklearn.ensemble.RandomForestRegressor.hlml (2010).
S. Joe and F. Y. Kuo, Remark on Algorithm 659: Implementing Sobol's quasirandom sequence generator, ACM Trans. Math. Softw. 29, 49-57 (2003).
Silver, D., et al. "Mastering chess and shogi by self-play with a general reinforcement learning algorithm", arXiv:1712.01815v1 [cs.AI] Dec. 5, 2017.
Silver, D., et al., "Mastering the game of Go with deep neural networks and tree search", Nature 2016; 529:484-489.
Tay et al., "Reluctant generalized additive modeling," Department of Statistics, and Department of Biomedical Data Science, Stanford University, Jan. 15, 2020, 20 pages.
Venkatasubramanian , V., "The Promise of Artificial Intelligence in Chemical Engineering: Is II Here, Finally?" AIChE Journal, vol. 65-2, pp. 467-479 (Dec. 19, 2018).
Yang, "A study of intermittent flow in downward inclined pipes," Ph.D. Dissertation, The University of Tulsa (1996).
Yang, et al, "An integrated multi-task control system for fuel-cell power plants", Decision and Control and European Control Conference (CDC-ECC), 2011 50th IEEE Conference, Dec. 12, 2011, 2988-2993.
Yu et al., "Reluctant Interaction Modeling," Department of Statistics, University of Washington, Seattle, Washington, 98105, Jul. 22, 2019, 32 pages.
Zendehboudi et al., "Applications of hybrid models in chemical, petroleum, and energy systems: A systematic review," Applied Energy, 228: 2539-2566 (2018).
Zhang et al., "Unified model for gas-liquid pipe flow via slug dynamics-Part 1: Model development," Trans. Of the ASME, 25: 266-273 (2003).
Zhang et al., "Unified model for gas-liquid pipe flow via slug dynamics-Part 2: Model validation," Trans. Of the ASME, 25: 274-283 (2003).
International Preliminary Report on Patentability for PCT/US2020/031636 dated Nov. 18, 2021, 11 pages.
International Preliminary Report on Patentability for PCT/US2020/034530 dated Dec. 16, 2021, 8-pages.
International Search Report and Written Opinion for International Application No. PCT/US2019/054465, entitled, "Apparatus and Methods for Non-Invasive Closed Loop Step Testing with Controllable Optimization Relaxation," dated Apr. 21, 2020.
Machine Translation for JP 2004-265381 A, obtained Jun. 2022 (Year 2022).
Fellini, R., et al., "Optimal design of automotive hybrid powertrain systems," Proceedings First International Symposium on Environmentally Conscious Design and Inverse Manufacturing, IEEE, pp. 400-405 (1999).
Moraru, I.I., et al., "Virtual Cell modelling and simulation software environment," IET System Biology, vol. 2, No. 5, pp. 352-362 (Sep. 2008).

(56) References Cited

OTHER PUBLICATIONS

Wetter, M., "A view on future building system modeling and simulation." Building performance simulation for design and operation. Routledge, pp. 631-656. (Year: 2019).

* cited by examiner

APPARATUS AND METHODS TO BUILD DEEP LEARNING CONTROLLER USING NON-INVASIVE CLOSED LOOP EXPLORATION

BACKGROUND

In the process industry, sustaining and maintaining process performance is an important component of advanced process control of an industrial or chemical plant. Sustained and maintained process performance may provide an extended period of efficient and safe operation and reduced maintenance costs at the plant. Prior solutions for advanced process control include linear dynamic models. For certain chemical process units, a linear dynamic model is not adequate to fully capture the process behavior, and the resulting controller cannot optimize the process to its fullest potential.

SUMMARY

In a process for which a more sophisticated model is needed, Deep Learning is a candidate for modeling the process. Deep Learning has the capability to capture very nonlinear behavior. However, building a Deep Learning model requires a significant amount of process data with rich content, which is normally not readily available from regular plant operation data.

Embodiments disclosed herein are directed to solving this issue. One example embodiment is a method for creating a Deep Learning based model predictive controller for an industrial process. The example method includes creating a linear dynamic model of the industrial process, and based on the linear dynamic model, creating a linear model predictive controller to control and perturb the industrial process. The linear model predictive controller is employed in the industrial process and data is collected during execution of the industrial process. The example method further includes training a Deep Learning model of the industrial process based on the data collected using the linear model predictive controller, and based on the Deep Learning model, creating a Deep Learning model predictive controller to control the industrial process.

Another example embodiment is a system for controlling an industrial process. The example system includes a linear dynamic model of the industrial process, a linear model predictive controller, a Deep Learning model of the industrial process, and a Deep Learning model predictive controller. The linear model predictive controller is configured to control and perturb the industrial process. It is created based on the linear dynamic model and is configured to be employed in the industrial process to collect data during execution of the industrial process. The Deep Learning model of the industrial process is trained based on the data collected using the linear model predictive controller. The Deep Learning model predictive controller is created based on the Deep Learning model, and is configured to control the industrial process.

Another example embodiment is a non-transitory computer-readable data storage medium comprising instructions to cause a computer to create a linear dynamic model of an industrial process, and based on the linear dynamic model, create a linear model predictive controller to control and perturb the industrial process. The instructions further cause the computer to employ the linear model predictive controller in the industrial process and collect data during execution of the industrial process. The instructions further cause the computer to train a Deep Learning model of the industrial process based on the data collected using the linear model predictive controller, and based on the Deep Learning model, create a Deep Learning model predictive controller to control the industrial process.

In some embodiments, the linear dynamic model may be a linear regression model. The linear model predictive controller can perform non-invasive closed-loop exploration to collect the data. The Deep Learning model can be a recurrent neural network. A piecewise linear dynamic model can be created based on the Deep Learning model and the Deep Learning model predictive controller can be optimized based on the piecewise linear dynamic model. Optimizing the Deep Learning model predictive controller can include smoothing derivatives of the Deep Learning model. Non-invasive closed-loop exploration can be used to further optimize the Deep Learning model predictive controller.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

New systems and methods are disclosed for building and updating a Deep Learning based advanced process controller. A simplified linear dynamic model (approximate model) can be built from readily available regular plant operation data, without dedicated plant perturbation. The approximate model then can be used to create a controller to carry out perturbation while keeping the plant in closed-loop control with relaxed economic optimization. As new informative data becomes available, a more sophisticated model, such as Deep Learning model, can be created, which can more accurately describe the plant behavior, such as severe non-linearity. Based on the Deep Learning model, a more sophisticated controller can be built, which can optimize the plant to its fullest potential. If needed, the Deep Learning based controller can continue the closed-loop perturbation with relaxed economic optimization, so that more data can be collected and the controller can be improved further.

This new paradigm overcomes problems associated with a more sophisticated controller, such as Deep Learning based controller, such as the need to optimize a severe nonlinear process when readily-available data can only yield a simplified approximate model. Further, the new solution can reduce the interruption to the plant operation compared to a conventional open-loop plant step testing approach, so that the new solution can be used on a regular basis to update the controller in response to plant condition changes.

Example Network Environment for Plant Processes

Figure 1:
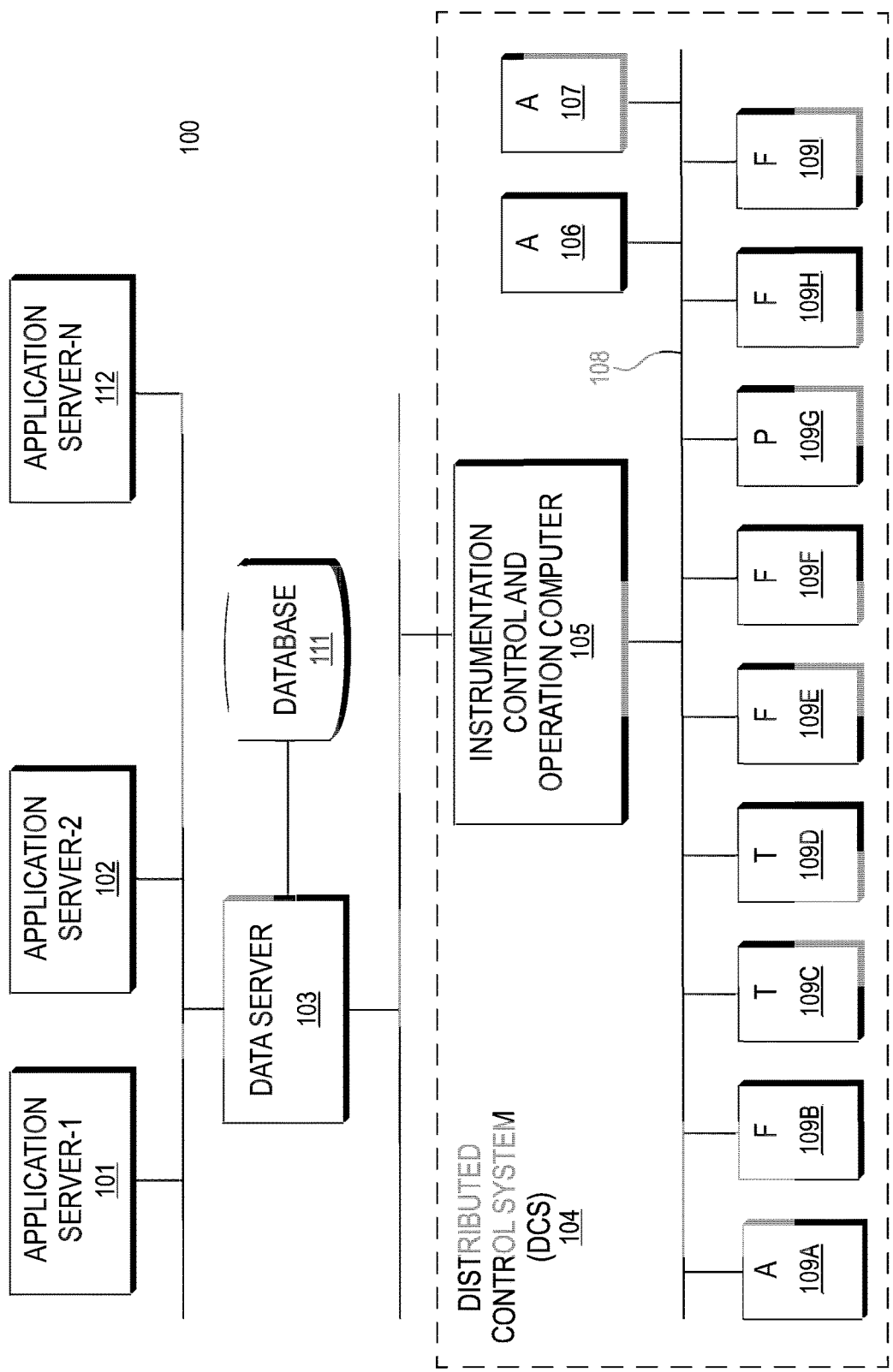
FIG. 1 is a block diagram illustrating an example network environment for data collection, monitoring, and controlling a plant process of the example embodiments disclosed herein.

FIG. 1 illustrates a block diagram depicting an example network environment 100 for monitoring plant processes in many embodiments. System computers 101, 102 may operate as controllers. In some embodiments, each one of the system computers 101, 102 may operate in real-time as a controller alone, or the computers 101, 102 may operate together as distributed processors contributing to real-time operations as a single controller. In other embodiments, additional system computers 112 may also operate as distributed processors contributing to the real-time operation as a controller.

The system computers 101 and 102 may communicate with the data server 103 to access collected data for measurable process variables from a historian database 111. The data server 103 may be further communicatively coupled to a distributed control system (DCS) 104, or any other plant control system, which may be configured with instruments 109A-109I, 106, 107 that collect data at a regular sampling period (e.g., one sample per minute) for the measurable process variables, 106, 107 are online analyzers (e.g., gas chromatographs) that collect data at a longer sampling period. The instruments may communicate the collected data to an instrumentation computer 105, also configured in the DCS 104, and the instrumentation computer 105 may in turn communicate the collected data to the data server 103 over communications network 108. The data server 103 may then archive the collected data in the historian database 111 for model calibration and inferential model training purposes. The data collected varies according to the type of target process.

The collected data may include measurements for various measurable process variables. These measurements may include, for example, a feed stream flow rate as measured by a flow meter 109B, a feed stream temperature as measured by a temperature sensor 109C, component feed concentrations as determined by an analyzer 109A, and reflux stream temperature in a pipe as measured by a temperature sensor 109D. The collected data may also include measurements for process output stream variables, such as, for example, the concentration of produced materials, as measured by analyzers 106 and 107. The collected data may further include measurements for manipulated input variables, such as, for example, reflux flow rate as set by valve 109F and determined by flow meter 109H, a re-boiler steam flow rate as set by valve 109E and measured by flow meter 109I, and pressure in a column as controlled by a valve 109G. The collected data reflect the operation conditions of the representative plant during a particular sampling period. The collected data is archived in the historian database 111 for model calibration and inferential model training purposes. The data collected varies according to the type of target process.

The system computers 101 or 102 may execute various types of process controllers for online deployment purposes. The output values generated by the controller(s) on the system computers 101 or 102 may be provided to the instrumentation computer 105 over the network 108 for an operator to view, or may be provided to automatically program any other component of the DCS 104, or any other plant control system or processing system coupled to the DCS system 104. Alternatively, the instrumentation computer 105 can store the historical data 111 through the data server 103 in the historian database 111 and execute the process controller(s) in a stand-alone mode. Collectively, the instrumentation computer 105, the data server 103, and various sensors and output drivers (e.g., 109A-109I, 106, 107) form the DCS 104 and can work together to implement and run the presented application.

The example architecture 100 of the computer system supports the process operation of in a representative plant. In this embodiment, the representative plant may be, for example, a refinery or a chemical processing plant having a number of measurable process variables, such as, for example, temperature, pressure, and flow rate variables. It should be understood that in other embodiments a wide variety of other types of technological processes or equipment in the useful arts may be used.

Figure 2:
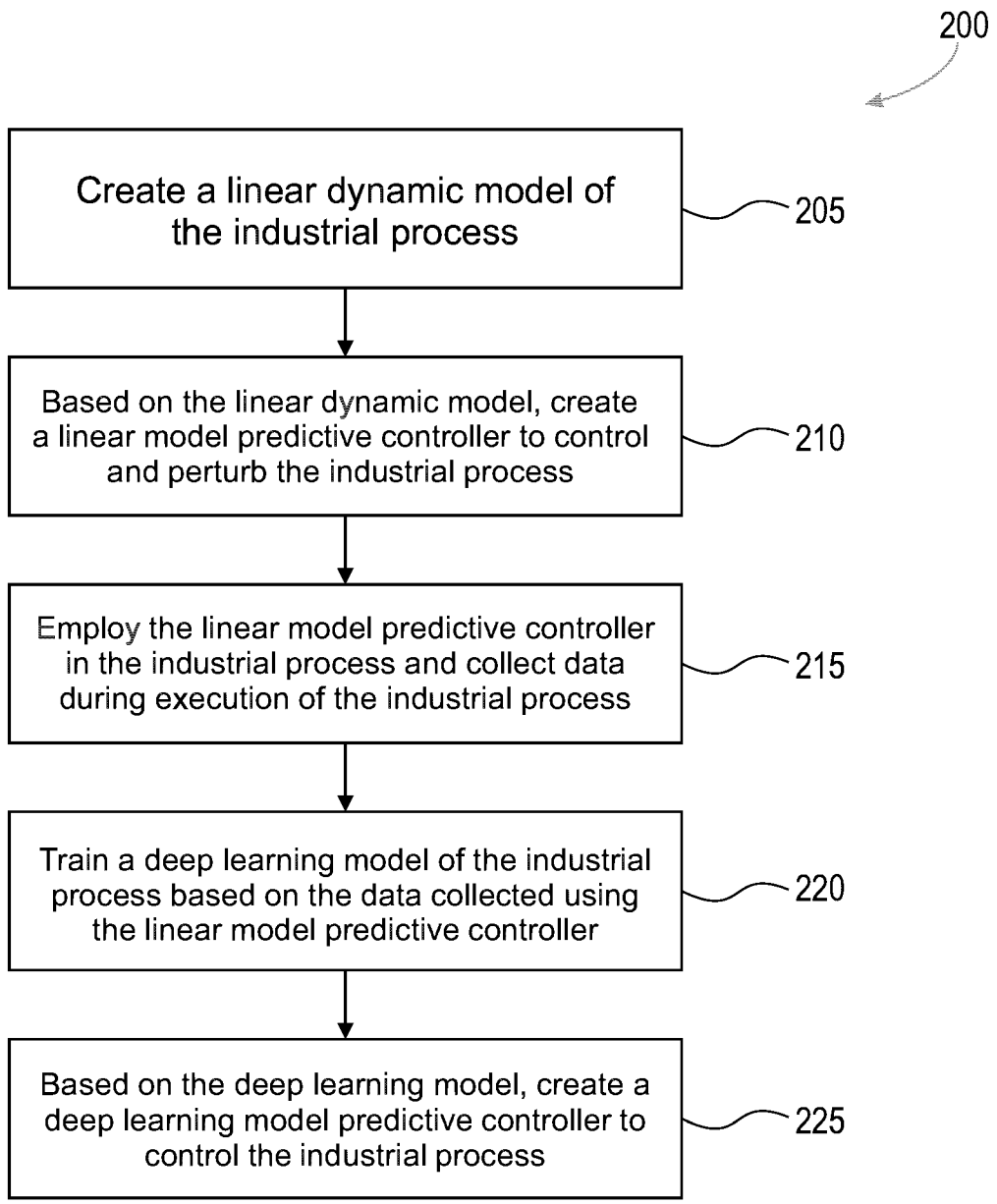
FIG. 2 is a flow diagram illustrating an example method for creating a Deep Learning based model predictive controller for an industrial process, according to an example embodiment.

FIG. 2 is a flow diagram illustrating an example method 200 for creating a Deep Learning based model predictive controller for an industrial process, according to an example embodiment. The example method 200 includes creating 205 a linear dynamic model of the industrial process, and based on the linear dynamic model, creating 210 a linear model predictive controller to control and perturb the industrial process. The linear model predictive controller is employed 215 in the industrial process and data is collected during execution of the industrial process. The example method further includes training 220 a Deep Learning model of the industrial process based on the data collected using the linear model predictive controller, and based on the Deep Learning model, creating 225 a deep learning model predictive controller to control the industrial process.

Figure 3:
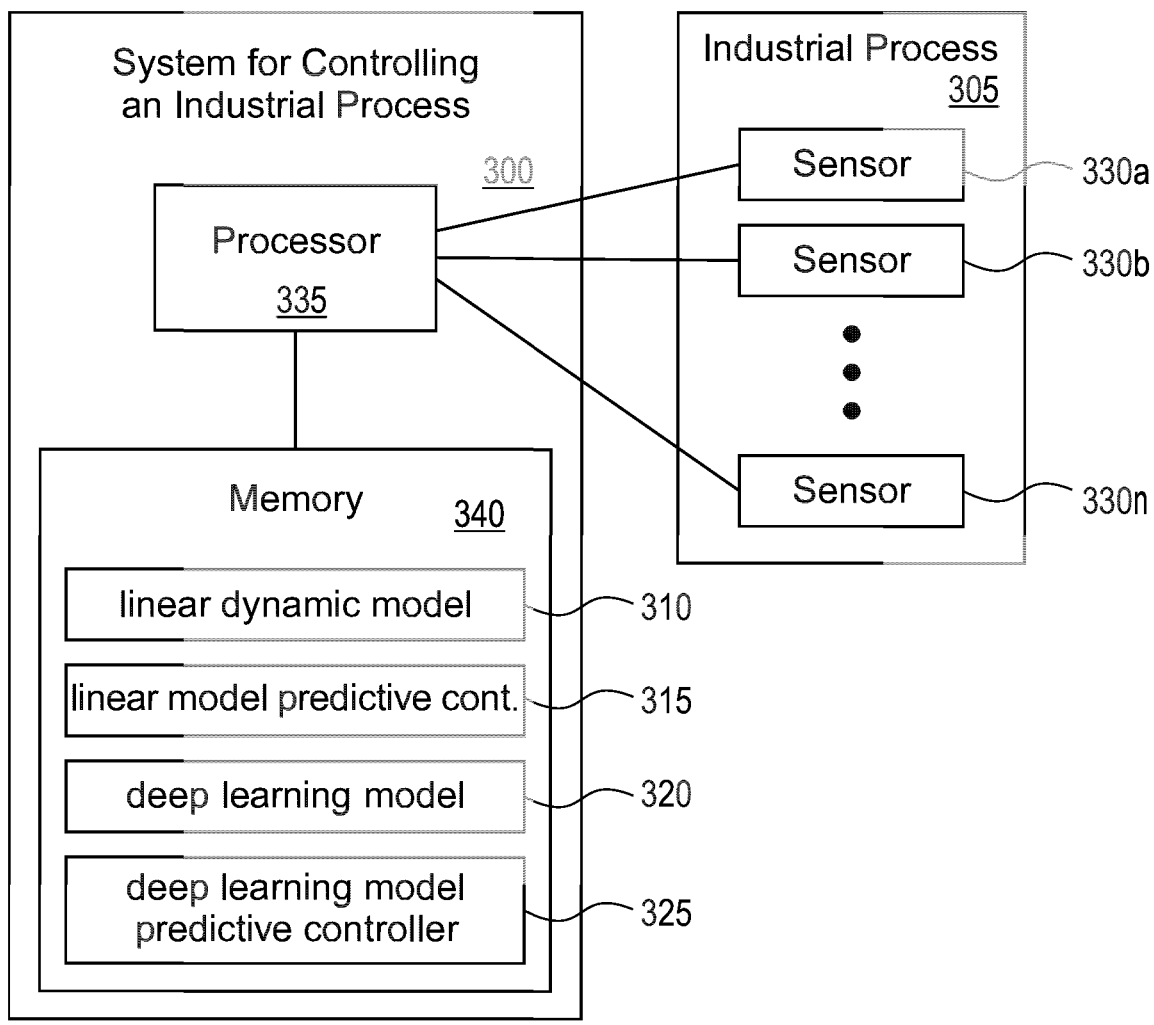
FIG. 3 is a block diagram illustrating an example system for controlling an industrial process, according to an example embodiment.

FIG. 3 is a block diagram illustrating a system 300 for controlling an industrial process 305, according to an example embodiment. The example system 300 includes a linear dynamic model 310 of the industrial process 305, a linear model predictive controller 315, a Deep Learning model 320 of the industrial process 305, and a Deep Learning model predictive controller 325. The linear model predictive controller 315 is configured to control and perturb the industrial process 305. It is created based on the linear dynamic model 310 and is configured to be employed in the industrial process 305 to collect data (e.g., from sensors 330a-n) during execution of the industrial process 305. The Deep Learning model 320 of the industrial process 305 is trained based on the data collected using the linear model predictive controller 315. The Deep Learning model predictive controller 325 is created based on the Deep Learning model 320, and is configured to control the industrial process 305. The linear dynamic model 310, linear model predictive controller 315, Deep Learning model 320, and Deep Learning model predictive controller 325 can be stored in memory 340, and implemented using a processor 335 of the system 300.

Details of an Example Embodiment

A generic dynamic process can be described as:

$$Y(k)=F(U(k),\ldots,U(k-N)) \quad (1)$$

Where, F is a linear or nonlinear function, k is the time, N is the dynamic memory length, U and Y are input variables and output variables, respectively.

$$U=[u1,u2,\ldots,um], m\geq 1$$

$$Y=[y1,y2,\ldots,yn], n\geq 1$$

The process operation constraints can be described as:

$$UL\leq U\leq UH \quad (2)$$

$$YL\leq Y\leq YH \quad (3)$$

Where, UL and UH are input variable low and high limits, and YL and YH are output variable low and high limits, respectively.

For a linear dynamic process, equation (1) can be re-written as $$Y(k) = \sum_{t=0}^{N} C(t) * U(k-t) \quad (4)$$

Figure 4:
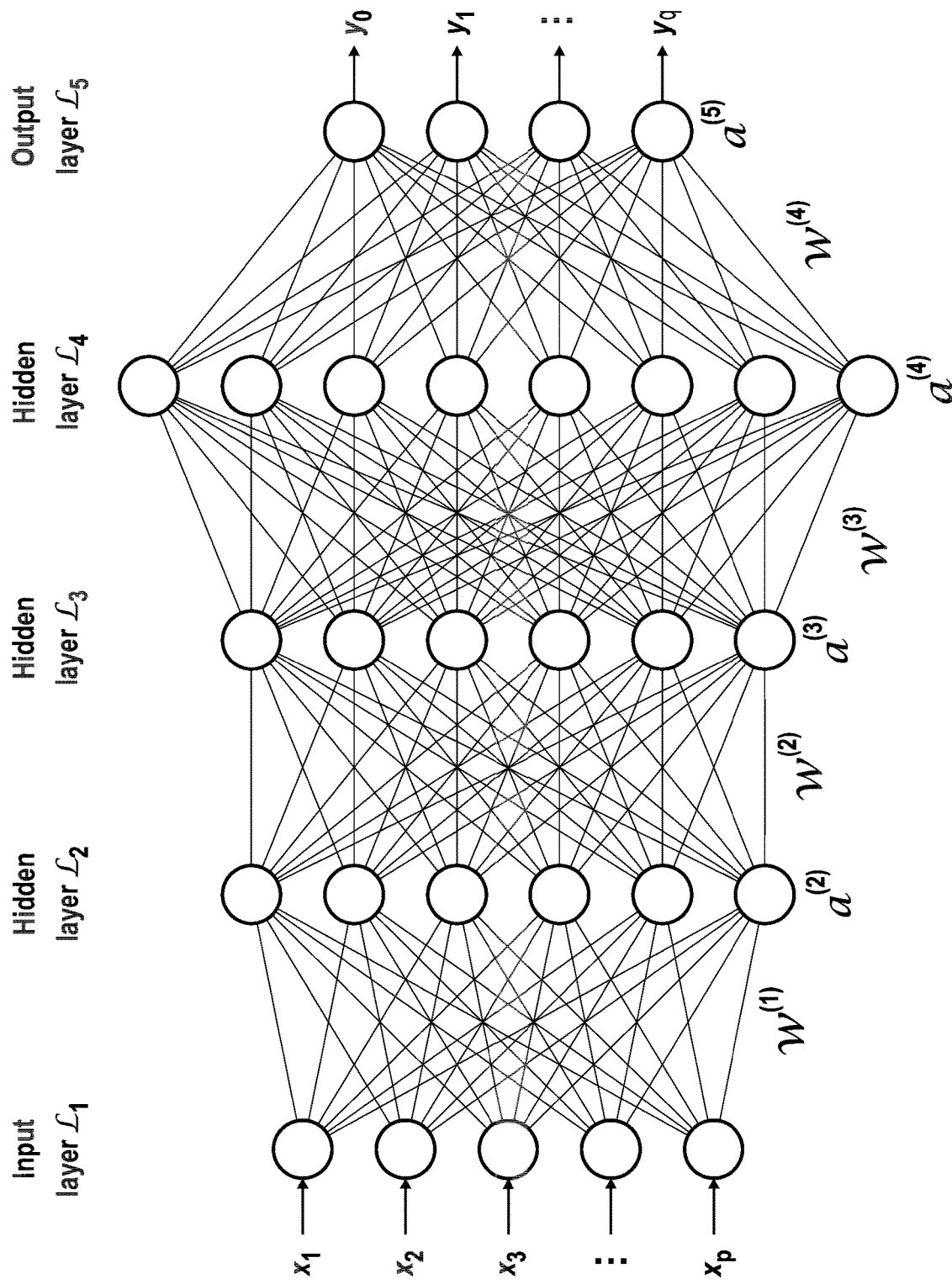
FIG. 4 illustrates a depiction of a Deep Learning neural network.

For a nonlinear dynamic process, a possible representation can be a Deep Learning model as illustrated in FIG. 4.

The goal of an advanced process controller is to find a sequence of process inputs so that the process outputs satisfy the process constraints while a pre-defined objective function J is optimized:

$$\min_{U} J(U, Y) \quad (5)$$

s.t. (1), (2), and (3)

Step 1: Create an approximate model.

Using available plant operation data and data cleaning technology, select the data segments that contain movements in the input variables. Use the selected data to identify a linear dynamic model (approximate model) as shown in (4).

Step 2: Build a linear controller to run closed-loop exploration (step testing).

Based on the created approximate model, construct a linear model predictive controller. Deploy the controller online. Choose a control/test tradeoff ratio to run the controller. Adjust the ratio to balance optimization and perturbation, as well as control robustness. See U.S. Pat. No. 9,513,610 for details regarding control/test tradeoff ratios, incorporated herein by reference.

Step 3: Train a Deep Learning model.

Train a Deep Learning model using the collected exploration data. To capture dynamics, a certain type of Recurrent Neural Network can be chosen, such as Long Short-Term Memory (LSTM). For control purposes, the Deep Learning model should have certain properties, such as no oscillation in derivatives. This can be accomplished through adjusting the hyperparameters as in, for example, TensorFlow package, or smoothing the Deep Learning derivatives before being supplied to the control calculation, as described below.

Step 4: Build a Deep Learning controller.

Model predictive control involves two major calculations: a steady-state target determination, and a dynamic move plan calculation. To use a Deep Learning model, some new algorithms can be used:

1) Choose a maximal allowed step fraction, a, for the input and output variables, where $0<\alpha\leq 1$.

2) Calculate the local derivatives from the Deep Learning model:

Let U(k+1)=U(k+2)= . . . =U(k+N)=Ucurrent, calculate the Deep Learning output values at k+N, Yss. Use [Ucurrent, Yss] as the reference point to calculate the numerical derivatives, $$\frac{\partial y}{\partial u},$$

from the Deep Learning model.

3) Run optimization problem (5) with the locally linearized model:

$$Y = Yss + \frac{\partial y}{\partial u} * (U - Ucurrent) \quad (6)$$

with the following additional constraints $$|U-Ucurrent|\leq (UH-UL)*a$$

$$|Y-Yss|\leq (YH-YL)*a \quad (7)$$

Denote the solution as [Ua, Ya].

4) Using [Ua, Ya] as the reference point, update the local derivatives from the Deep Learning model, and then re-run 3). If the new solution appears to be oscillating around the previous solution, stop the iteration; otherwise continue the iteration.

5) Create a piecewise linear dynamic model:

Generate a step response curve from the Deep Learning model by making a delta change in each of the inputs, one at a time. The delta change direction can be determined by the sign of (Ua–Ucurrent). The gain of the step response curve can be determined by $$G = \frac{Ya - Yss}{Ua - Ucurrent} \quad (8)$$

6) Calculate a Dynamic Move Plan:

Follow a conventional approach in linear model predictive control to calculate a dynamic move plan using the linear model (8).

7) Smooth the local derivatives:

If the Deep Learning model has high uncertainty, the locally calculated derivatives can be noisy, which means that the derivatives can change values significantly or even change signs when the reference point makes a small change. This cannot be justified by the physical process and can cause the controller to misbehave. To overcome this problem, the derivatives should not rely on a single reference point; instead, average derivatives from the range defined by (7) can be used.

Step 5: Adaptation of Deep Learning controller

After the Deep Learning controller deployed online, it can be further improved using a similar approach as described in U.S. Pat. No. 9,513,610, with the following modification: When calculating a step move size, use (6) and (7) instead of the Deep Learning model.

Figure 5:
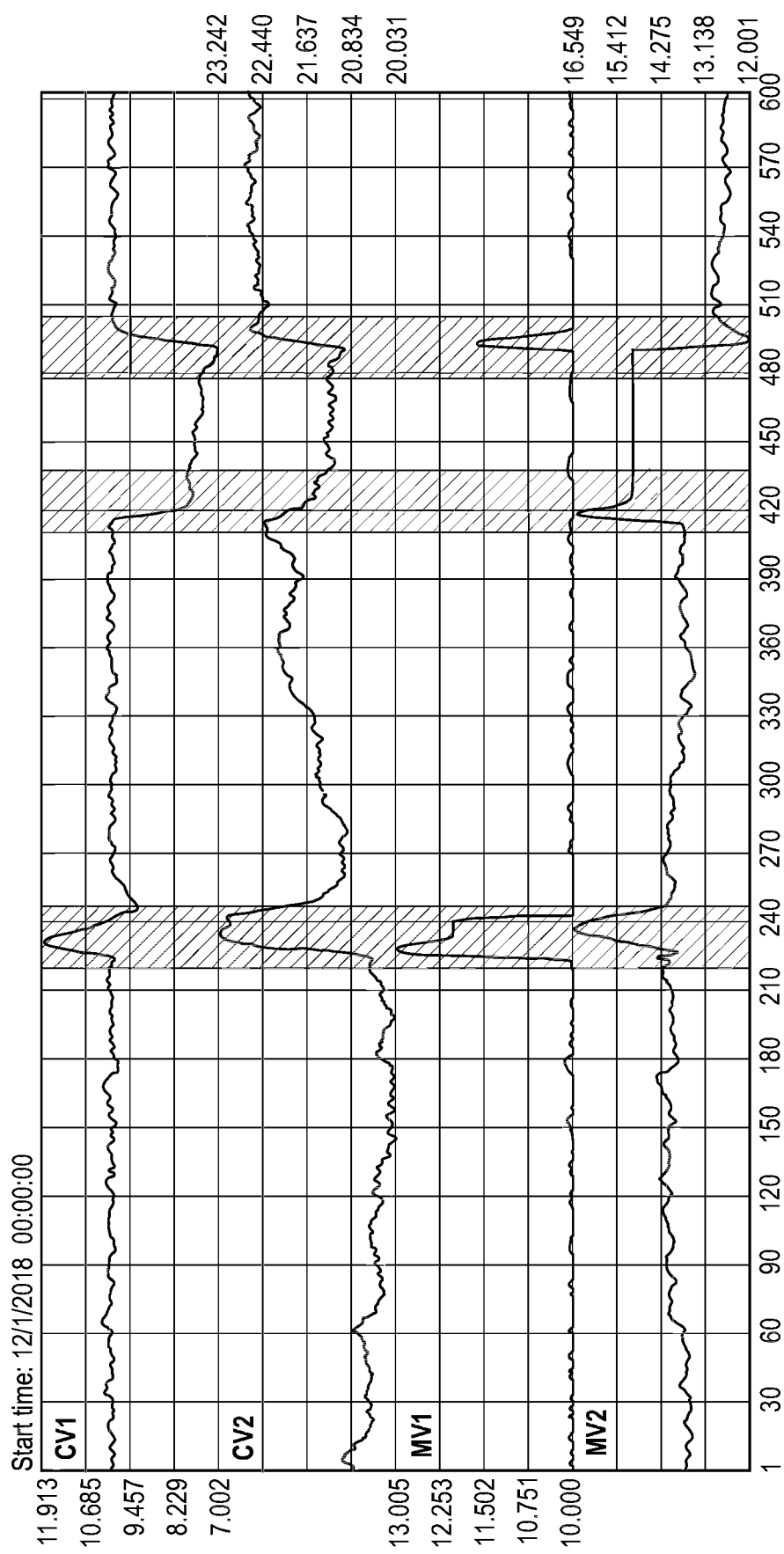
FIG. 5 is a graph illustrating example plant operation data.

The following is an example to illustrate the concepts presented above. FIG. 5 shows a chemical plant operation dataset with two input variables (MV1 and MV2) and two output variables (CV1 and CV2). The majority of the data represents regulatory actions in MV1 and MV2 to keep CV1 and CV2 in their operating targets; only a small portion of them, as highlighted in strips, contains useful information for modeling purpose (e.g., to have meaningful cause-effect relationship between input and output variables). This dataset can be used to create a simplified approximate model, but may not be enough for building a more sophisticated accurate model such as a Deep Learning model.

Figure 6:
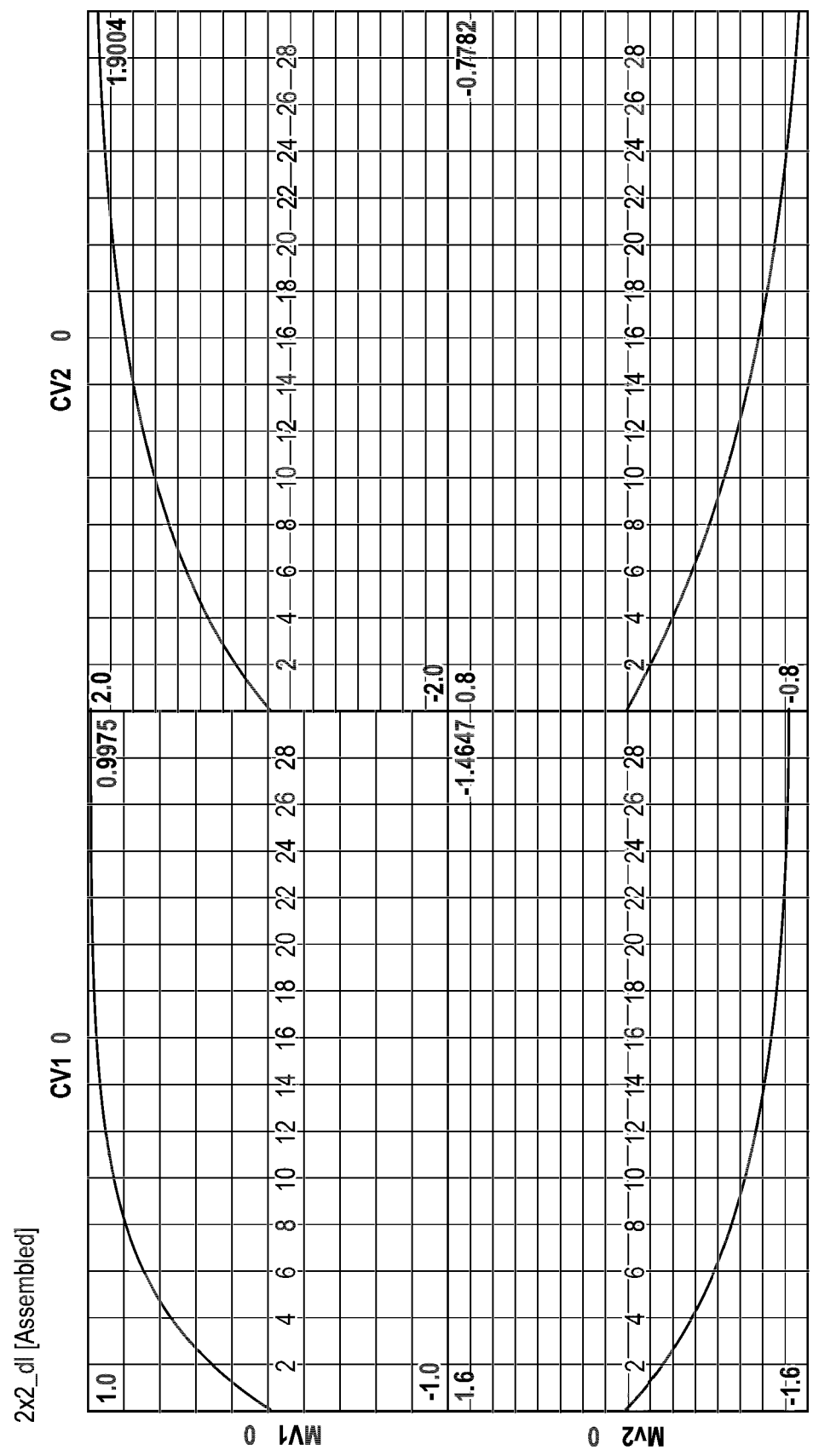
FIG. 6 illustrates an example linear regression model.

A select portion from the plant operation data can be used to create a simplified linear regression model, such as the step response model shown in FIG. 6. A step response model describes how an output variable evolves over time when an input variable steps up one unit. This type of model is often used in a linear model predictive controller.

Figure 7:
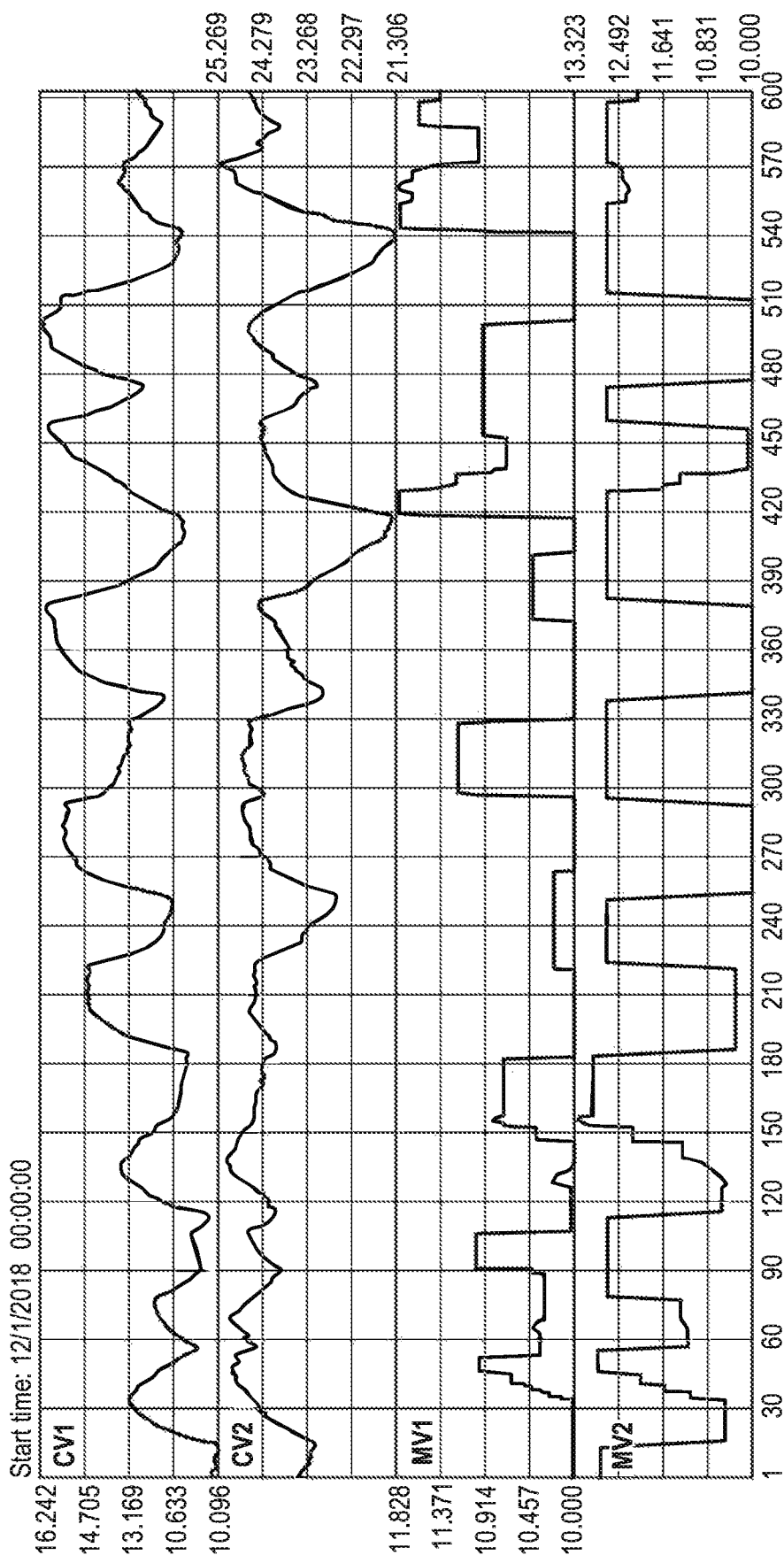
FIG. 7 is a graph illustrating example data generated from a controller executing non-invasive closed-loop exploration.

With the linear dynamic model, a linear model predictive controller can be constructed and, using the technology detailed in U.S. Pat. No. 9,513,610, for example, this controller can be used to control and perturb the plant simultaneously. It can generate more data with rich content for modeling purpose, as illustrated in FIG. 7.

Figure 8:
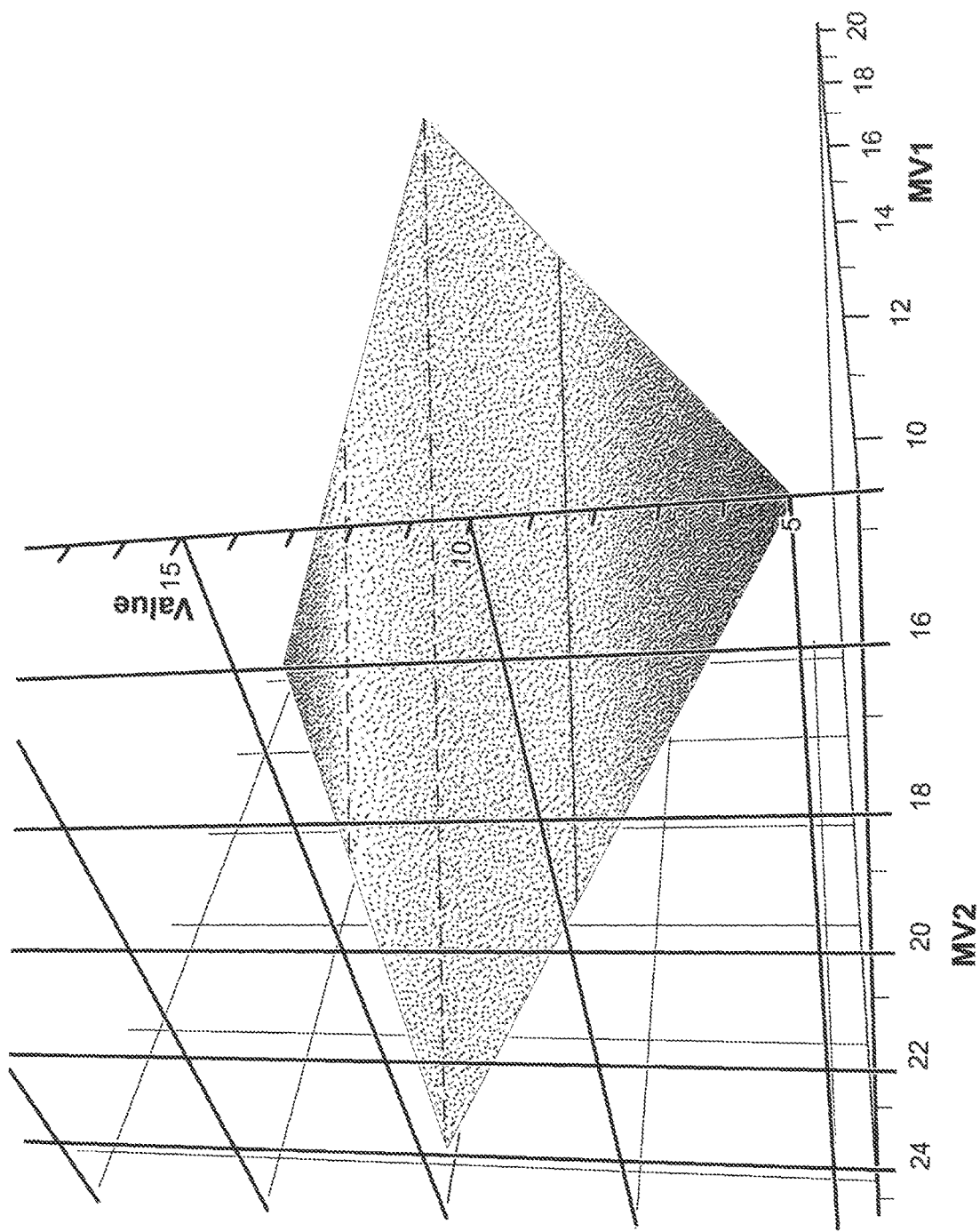
FIG. 8 is a graph illustrating an example input-output relationship represented by a linear regression model.
Figure 9:
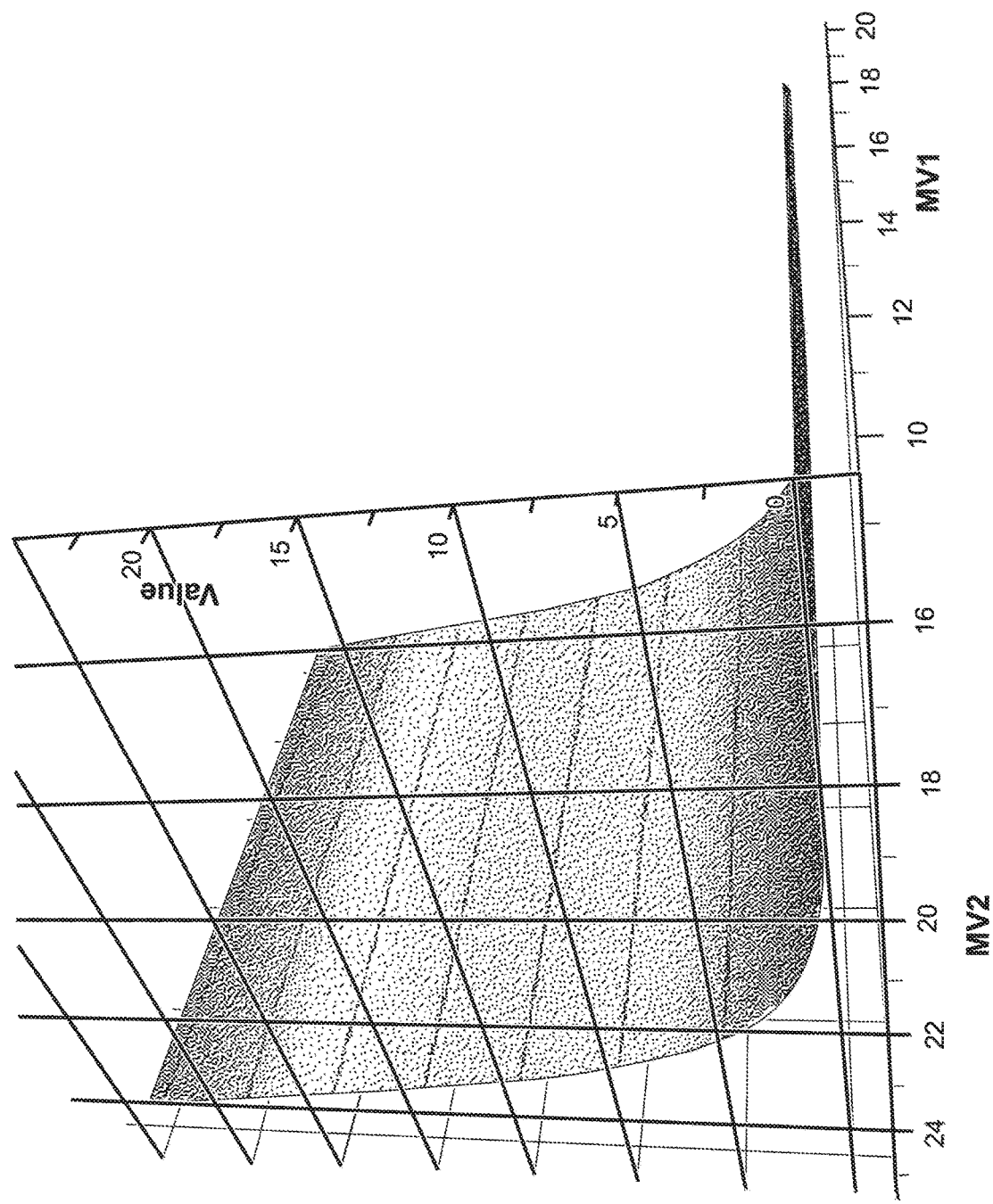
FIG. 9 is a graph illustrating an example input-output relationship represented by a Deep Learning model.

Using the new data, a more sophisticated model such as a Deep Learning model can be created and then used to construct a Deep Learning based model predictive controller. FIG. 8 shows the relationship between input and output variables in steady-state when a linear regression model is used. FIG. 9 shows the relationship when a Deep Learning model is used. The later can more accurately describe a plant's dynamic behavior, which, in turn, can achieve better control performance.

Example Digital Processing Environment

Figure 10:
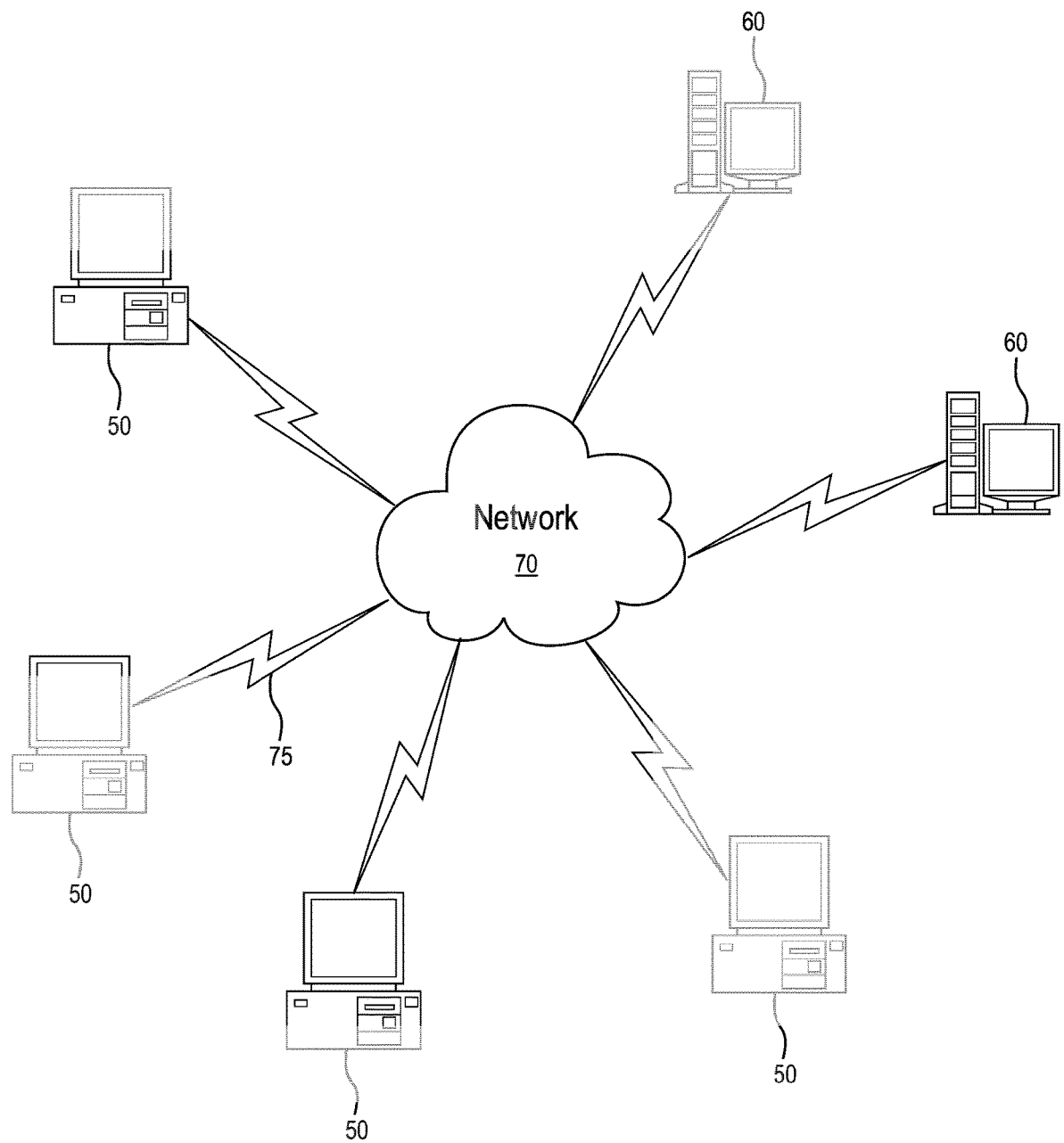
FIG. 10 is a schematic view of a computer network in which embodiments can be implemented.

FIG. 10 illustrates a computer network or similar digital processing environment in which the disclosed embodiments may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 11:
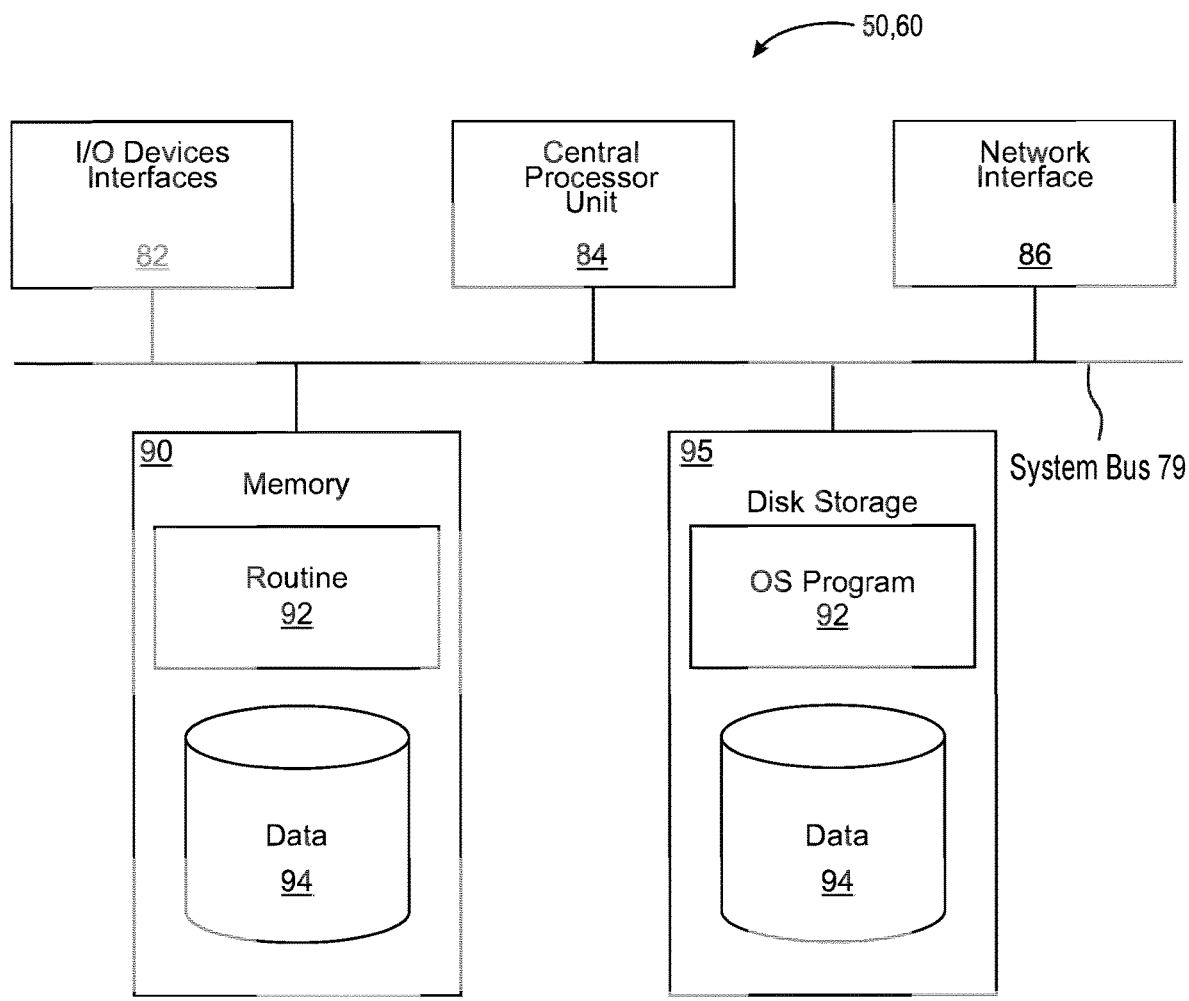
FIG. 11 is a block diagram of a computer node or device in the computer network of FIG. 10.

FIG. 11 is a diagram of the internal structure of a computer (e.g., client processor/device 50 or server computers 60) in the computer system of FIG. 10. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports) that enables the transfer of information between the elements. Attached to system bus 79 is I/O device interface 82 for connecting various input and output devices (e.g., keyboard, mouse, displays, printers, speakers) to the computer 50, 60. Network interface 86 allows the computer to connect to various other devices attached to a network (e.g., network 70 of FIG. 10). Memory 90 provides volatile storage for computer software instructions 92 and data 94 used to implement an embodiment (e.g., method 200 of FIG. 2, modules 310, 315, 320, and 325 of FIG. 3, and the Deep Learning architecture of FIG. 4). Disk storage 95 provides non-volatile storage for computer software instructions 92 and data 94 used to implement an embodiment. Data 94 may include plant operating plans, plant scheduling plans, datasets of operating and/or scheduling plan data cases, PCA models, instructions for clustering techniques, hierarchical clustering structures, metadata structures, and so forth as previously discussed. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes) that provides at least a portion of the software instructions for the disclosed system. Computer program product 92 can be installed by any suitable software installation procedure, as is well known in the art. In another embodiment, at least a portion of the software instructions may also be downloaded over a cable, communication, and/or wireless connection. In other embodiments, the programs are a computer program propagated signal product 74 (FIG. 10) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

It should be understood that the flow diagrams, block diagrams, and network diagrams may include more or fewer elements, be arranged differently, or be represented differently. But further it should be understood that certain implementations may dictate the block and network diagrams and the number of block and network diagrams illustrating the execution of the embodiments be implemented in a particular way. Accordingly, further embodiments may also be implemented in a variety of computer architectures, physical, virtual, cloud computers, and/or some combination thereof, and, thus, the data processors described herein are intended for purposes of illustration only and not as limitations of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method for controlling a non-linear chemical process, implemented at a real-world industrial plant, by creating a deep learning based model predictive controller for the non-linear chemical process, the method comprising:

creating a linear dynamic model of the non-linear chemical process;

based on the linear dynamic model, creating a linear model predictive controller to control and perturb the non-linear chemical process;

employing the linear model predictive controller in the non-linear chemical process to control and perturb the non-linear chemical process and collecting, via one or more instruments at the real-world industrial plant, data from the non-linear chemical process during execution of the non-linear chemical process subject to control and perturbation implemented by the linear model predictive controller, the data collected capturing non-linear behavior of the non-linear chemical process;

training a deep learning model of the non-linear chemical process based on the data collected from the non-linear chemical process during the execution of the non-linear chemical process subject to the control and perturbation by the linear model predictive controller;

based on the deep learning model, creating a deep learning model predictive controller to control the non-linear chemical process; and employing the deep learning model predictive controller in the non-linear chemical process to control the non-linear chemical process implemented at the real-world industrial plant.

2. The method of claim 1 wherein the linear dynamic model is a linear regression model.

3. The method of claim 1 wherein the linear model predictive controller performs non-invasive closed-loop exploration to collect the data.

4. The method of claim 1 wherein the deep learning model is a recurrent neural network.

5. The method of claim 1 further comprising creating a set of piecewise linear dynamic models based on the deep learning model and optimizing the deep learning model predictive controller based on the piecewise linear dynamic models.

6. The method of claim 1 further comprising optimizing the deep learning model predictive controller by smoothing derivatives of the deep learning model.

7. The method of claim 1 wherein the deep learning model predictive controller performs non-invasive closed-loop exploration to optimize the deep learning model predictive controller.

8. A system for controlling a non-linear chemical process implemented at a real-world industrial plant, the system comprising:

a computer memory storing a linear dynamic model of the non-linear chemical process;

a linear model predictive controller communicatively coupled to the computer memory and configured to control and perturb the non-linear chemical process, the linear model predictive controller being supported by the linear dynamic model and collecting, via one or more instruments at the real-world industrial plant, data from the non-linear chemical process during execution of the non-linear chemical process subject to control and perturbation implemented by the linear model predictive controller, the data collected capturing non-linear behavior of the non-linear chemical process;

a deep learning model of the non-linear chemical process stored in the computer memory and trained based on the data collected from the non-linear chemical process during the execution of the non-linear chemical process subject to the control and perturbation by the linear model predictive controller; and a deep learning model predictive controller configured to control the non-linear chemical process, the deep learning model predictive controller responsively generated based on the deep learning model, and employed in the non-linear chemical process to control the non-linear chemical process implemented at the real-world industrial plant.

9. The system of claim 8 wherein the linear dynamic model is a linear regression model.

10. The system of claim 8 wherein the linear model predictive controller is configured to perform non-invasive closed-loop exploration to collect the data.

11. The system of claim 8 wherein the deep learning model is a recurrent neural network.

12. The system of claim 8 further comprising a set of piecewise linear dynamic models created based on the deep learning model and used to optimize the deep learning model predictive controller.

13. The system of claim 8 wherein derivatives of the deep learning model are smoothed in an optimization calculation.

14. The system of claim 8 wherein the deep learning model predictive controller is configured to perform non-invasive closed-loop exploration to optimize the deep learning model predictive controller.

15. A non-transitory computer-readable data storage medium for controlling a non-linear chemical process implemented at a real-world industrial plant, the computer-readable data storage medium comprising instructions to cause a computer to:

create a linear dynamic model of the non-linear chemical process;

based on the linear dynamic model, create a linear model predictive controller to control and perturb the non-linear chemical process;

employ the linear model predictive controller in the non-linear chemical process to control and perturb the non-linear chemical process and collect, via one or more instruments at the real-world industrial plant, data from the non-linear chemical process during execution of the non-linear chemical process subject to control and perturbation implemented by the linear model predictive controller, the data collected capturing non-linear behavior of the non-linear chemical process;

train a deep learning model of the non-linear chemical process based on the data collected from the non-linear chemical process during the execution of the non-linear chemical process subject to the control and perturbation by the linear model predictive controller;

based on the deep learning model, create a deep learning model predictive controller to control the non-linear chemical process; and employ the deep learning model predictive controller in the non-linear chemical process to control the non-linear chemical process implemented at the real-world industrial plant.

16. The non-transitory computer-readable data storage medium of claim 15 wherein the linear dynamic model is a linear regression model.

17. The non-transitory computer-readable data storage medium of claim 15 wherein the instructions cause the linear model predictive controller to perform non-invasive closed-loop exploration to collect the data.

18. The non-transitory computer-readable data storage medium of claim 15 wherein the deep learning model is a recurrent neural network.

19. The non-transitory computer-readable data storage medium of claim 15 wherein the instructions cause the computer to create a set of piecewise linear dynamic models based on the deep learning model and optimize the deep learning model predictive controller based on the piecewise linear dynamic models.

20. The non-transitory computer-readable data storage medium of claim 15 wherein the instructions cause the deep learning model predictive controller to perform non-invasive closed-loop exploration to optimize the deep learning model predictive controller.

* * * * *